United States Patent
Hong

(10) Patent No.: US 12,150,185 B2
(45) Date of Patent: Nov. 19, 2024

(54) METHOD AND APPARATUS FOR CONNECTION ESTABLISHMENT, BASE STATION, USER EQUIPMENT, AND CORE NETWORK DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 342 days.

(21) Appl. No.: 17/771,569

(22) PCT Filed: Oct. 29, 2019

(86) PCT No.: PCT/CN2019/113886
§ 371 (c)(1),
(2) Date: Apr. 25, 2022

(87) PCT Pub. No.: WO2021/081731
PCT Pub. Date: May 6, 2021

(65) Prior Publication Data
US 2022/0369391 A1 Nov. 17, 2022

(51) Int. Cl.
*H04W 76/10* (2018.01)
*H04W 48/08* (2009.01)
*H04W 48/18* (2009.01)
*H04W 68/00* (2009.01)

(52) U.S. Cl.
CPC ........... *H04W 76/10* (2018.02); *H04W 48/08* (2013.01); *H04W 48/18* (2013.01); *H04W 68/005* (2013.01)

(58) Field of Classification Search
CPC ..... H04W 76/10; H04W 48/08; H04W 48/18; H04W 68/005
See application file for complete search history.

(56) References Cited

U.S. PATENT DOCUMENTS

2018/0302877 A1  10/2018  Bosch et al.

FOREIGN PATENT DOCUMENTS

| CN | 106412905 A | 2/2017 | |
| CN | 107404759 A | 11/2017 | |
| DE | 112017000018 T5 * | 12/2017 | ............ H04W 16/32 |
| EP | 3512272 A | 7/2019 | |

OTHER PUBLICATIONS

PCT/CN2019/113886 International Search Report, dated Feb. 19, 2020 2 pages.
European Patent Application No. 19950951.4, Search and Opinion dated Jul. 10, 2023, 12 pages.
Ericsson "Is UE AS slice agnostic or not?" 3GPP TSG-RAN WG2 #97bis, Tdoc R2-1702554, Apr. 2017, 5 pages.
Indian Patent Application No. 202247030266, Office Action dated Sep. 14, 2022, 5 pages.

* cited by examiner

*Primary Examiner* — Samina F Choudhry
(74) *Attorney, Agent, or Firm* — Cozen O'Connor

(57) ABSTRACT

A method for establishing connection includes: receiving network slice information and target user equipment (UE) information that correspond to a service to be transmitted and that are sent by a core network; and sending the network slice information to a target UE corresponding to the target UE information. The network slice information is configured for establishing a connection between the target UE and a base station. A base station, a user equipment, and a core network device implement aspects of the method.

12 Claims, 6 Drawing Sheets receiving target UE information and network slice information corresponding to a service to be transmitted sent by a core network — S101 sending the network slice information to a target UE corresponding to the target UE information, wherein the network slice information is configured for establishing a connection between the target UE and the base station — S102

METHOD AND APPARATUS FOR CONNECTION ESTABLISHMENT, BASE STATION, USER EQUIPMENT, AND CORE NETWORK DEVICE

CROSS-REFERENCE TO RELATED APPLICATION

This application is the US national phase application of International Application No. PCT/CN2019/113886, filed on Oct. 29, 2019, the entire contents of which are incorporated herein by reference.

TECHNICAL FIELD

The present disclosure relates to the field of communication technologies, and in particular, to a method and an apparatus for a establishing connection, a base station, a user equipment, a core network device and a computer readable storage medium.

BACKGROUND

Mobile communication technology and industries are entering the development phase of the fifth-generation mobile communication technology (5G). 5G will meet the needs of people for high flow density, ultra-high connections, and ultra-high mobility, and can provide users with high-definition video, virtual reality, enhancement reality, cloud desktop, online games and other extreme business experiences. 5G will penetrate into the fields of the Internet of Things, will be deeply integrated with industrial facilities, medical instruments, and transportation, and will effectively meet the information services in vertical industries such as industrial, medical, and transportation. It can be seen that the future 5G network can support more diverse and more rich business types, terminal types and service types, compared with the fourth-generation mobile communication technology (4G) network age. Different businesses have different technical specification requirements for the 5G network, such as mobility requirements, billing requirements, security requirements, delay requirements, and reliability requirements.

The traditional cellular network adopts a "one-size-fits-all approach" network architecture, which is suitable for a single service type network. However, using this vertical architecture, operators find it difficult to expand the network, and it is also difficult to adjust according to the above-mentioned changing users, businesses and industry needs, and meet the needs of new applications. Therefore, in the 5G network, the "one-size-fits-all approach" mode of the traditional cellular network can no longer meet different needs of the network of various services in the 5G era. Operators need to take certain measures to flexibly adjust and combine network performance indicators such as rate, capacity and coverage, thereby meeting different business personalized needs.

Network slicing is one of the means of solving the above problems. By slicing network resources, a single physical network can be divided into multiple logic virtual networks, and by allocating separate network slices for typical business scenarios, and designing enhanced network architectures within the slices for business needs, right resource allocation and process optimization is realized. The multiple network slices share network infrastructure, thereby improving network resource utilization, and providing best support for different services used by different user groups.

SUMMARY

According to a first aspect of the present disclosure, a method for establishing connection is provided. The method is performed by a base station and includes:
  receiving target user equipment (UE) information and network slice information corresponding to a service to be transmitted, sent by a core network; and
  sending the network slice information to a target UE corresponding to the target UE information, wherein the network slice information is configured for establishing a connection between the target UE and the base station.

According to a second aspect of embodiments of the present disclosure, a method for establishing connection is provided. The method is performed by a user equipment (UE), and includes:
  receiving network slice information corresponding to a service to be transmitted, sent by a base station;
  establishing a connection with the base station according to the network slice information.

According to a third aspect of the present disclosure, a method for establishing connection is provided. The method is performed by a core network device, and includes:
  determining a service to be transmitted to a target user equipment (UE);
  sending target UE information and network slice information corresponding to the service to be transmitted to a base station.

According to a fourth aspect of embodiments of the present disclosure, a base station is provided, including:
  a processor;
  a memory configured to store instructions executable by the processor;
  wherein the processor is configured to:
  receive target user equipment (UE) information and network slice information corresponding to a service to be transmitted, sent by a core network;
  send the network slice information to a target UE corresponding to the target UE information, wherein the network slice information is configured for establishing a connection between the target UE and the base station.

According to a fifth aspect of embodiments of the present disclosure, a user equipment is provided, including:
  a processor;
  a memory configured to store instructions executable by the processor;
  wherein the processor is configured to:
  receive network slice information corresponding to a service to be transmitted, sent by a base station;
  establish a connection with the base station according to the network slice information.

According to a sixth aspect of embodiments of the present disclosure, a core network device is provided, including:
  a processor;
  a memory configured to store instructions executable by the processor;
  wherein the processor is configured to:
  determine a service to be transmitted to a target user equipment (UE);
  send target UE information and network slice information corresponding to the service to be transmitted to a base station.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

DETAILED DESCRIPTION

Example embodiments will be described in detail herein, examples of which are illustrated in the accompanying drawings. Where the following description refers to the drawings, the same numerals in different drawings refer to the same or similar elements unless otherwise indicated. The implementations described in the illustrative examples below are not intended to represent all implementations consistent with this disclosure. Rather, they are merely examples of apparatus and methods consistent with some aspects of the present disclosure as recited in the appended claims.

According to the Third Generation Partnership (3GPP) protocol, a terminal supports up to 8 network slices, and different base stations can support different types of network slices. However, the current wireless side will not distinguish between network slices. When there is a service to be transmitted to an idle UE, the idle UE does not know from which network slice the service comes, and needs to try each network slice supported itself one by one to connect with the base station, which takes long time.

Figure 1:
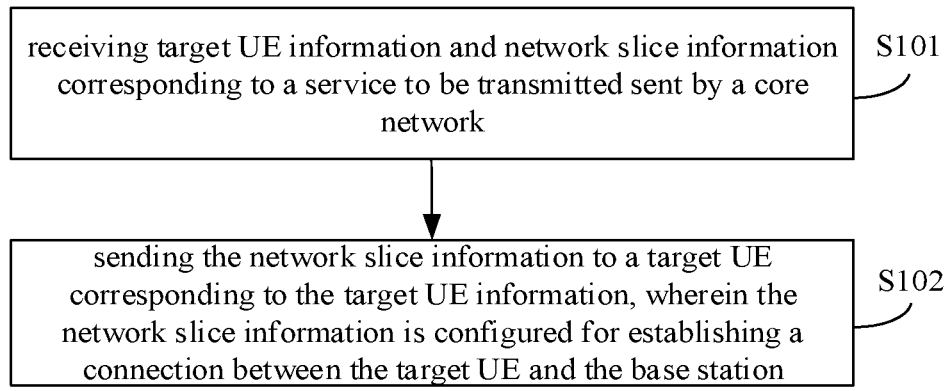
FIG. 1 is a flowchart of a method for establishing connection illustrated in an example embodiment of the present disclosure.

FIG. 1 is a flowchart of a method for establishing connection illustrated in an example embodiment of the present disclosure, which is described from the base station side. As shown in FIG. 1, the method for establishing connection includes following steps.

In step S101, target UE information and network slice information corresponding to a service to be transmitted, sent by a core network are received.

The service to be transmitted may include, but is not limited to, ultra reliable low latency communication (URRLLC) service, and enhanced mobile broad band (eMBB) service.

When the core network is to transmit the service to be transmitted to a target UE, that is, a UE in an idle state, the target UE information and the network slice information corresponding to the service to be transmitted can be sent to the base station. The network slice information may include one or more network slice identifier.

The base station can receive a first paging signaling sent by the core network through an interface between the core network and the base station, and acquire the target UE information and the network slice information corresponding to the service to be transmitted from the first paging signaling.

When the base station is a 4G base station, the interface between the core network and the base station may be an S1 interface. When the base station is a 5G base station, the interface between the core network and the base station may be a next generation (NG) interface.

In step S102, the network slice information is sent to a target UE corresponding to the target UE information. The network slice information is configured for establishing a connection between the target UE and the base station.

After receiving the network slice information corresponding to the service to be transmitted, the base station can add the network slice information to a second paging signaling, and send the second paging signaling added with the network slice information to the target UE corresponding to the target UE information through an air interface.

In this embodiment, the network slice information can be added to the second paging signaling in a variety of ways.

Way 11) Add a new signaling in the second paging signaling and add the network slice information in the new signaling.

Way 12) Add a new information unit to the second paging signaling and add the network slice information in the new information unit.

Way 13) Add the network slice information in the existing signaling of the second paging signaling.

For example, the existing signaling may be PagingRecord, and the second paging signaling added with the network slice information is shown as follows, where the black coarse portion is the added network slice information.

```
Paging ::=                    SEQUENCE {
    pagingRecordList          PagingRecordList
OPTIONAL, - Need N
    lateNonCriticalExtension  OCTET STRING
OPTIONAL,
    nonCriticalExtension      SEQUENCE{}
OPTIONAL
}
```

```
PagingRecordList ::=    SEQUENCE (SIZE(1..maxNrofPageRec)) OF PagingRecord
PagingRecord ::=        SEQUENCE {
  ue-Identity             PagingUE-Identity,
  accessType              ENUMERATED {non3GPP} OPTIONAL, -NeedN
  s-NSSAI-List            SEQUENCE (SIZE (1..maxNrofS-NSSAI)) OF S-NSSAI OPTIONAL,
  ...
}
PagingUE-Identity ::=   CHOICE {
  ng-5G-S-TMSI              NG-5G-S-TMSI,
  fullI-RNTI                I-RNTI-Value,
  ...
}
```

In this embodiment, after receiving the network slice information, the UE can establish the connection with the base station according to the network slice information.

It should be noted that the above-mentioned first paging signaling and second paging signaling are not names of signaling, but are used to distinguish different paging signaling.

In the above embodiment, by receiving the network slice information corresponding to the service to be transmitted, sent by the core network, and sending the network slice information to the target UE, the target UE can be connected to the base station according to the network slice corresponding to the service to be transmitted, which can reduce time and resources consumed for connection establishment, compared with the target UE trying respective network slices supported by itself one by one to connect with the base station.

Figure 2:
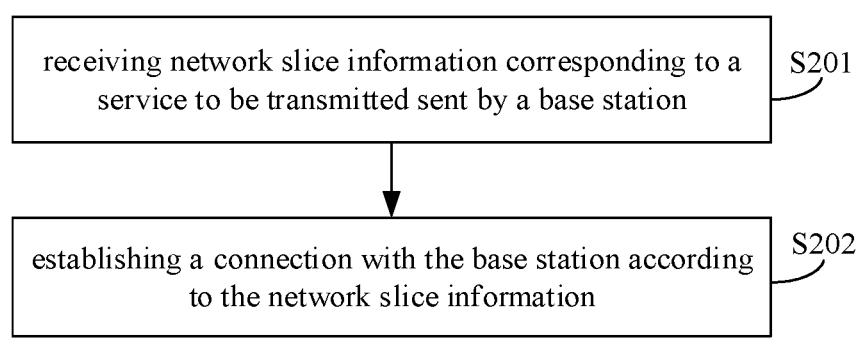
FIG. 2 is a flowchart of another method for establishing connection illustrated in an example embodiment of the present disclosure.

FIG. 2 is a flowchart of another method for establishing connection illustrated in an example embodiment of the present disclosure. This embodiment is described from the UE side. As shown in FIG. 2, the method for establishing connection includes following steps.

In step S201, network slice information corresponding to a service to be transmitted sent by a base station is received.

In this embodiment, the UE may receive a second paging signaling sent by the base station through an air interface, and obtain the network slice information from the second paging signaling.

Since the base station can add the network slice information to a new signaling of the second paging signaling, the UE can obtain the network slice information from the new signaling of the second paging signaling.

Since the base station can add the network slice information in a new information unit of the second paging signaling, the UE can obtain the network slice information from the new information unit of the second paging signaling.

Since the base station can add the network slice information to the existing signaling of the second paging signaling, the UE can obtain the network slice information from the existing signaling of the second paging signaling.

In step S202, a connection is established with the base station according to the received network slice information.

Establishing the connection with the base station according to the network slice information may include, but is not limited to: selecting a target network slice from the network slices supported by the UE according to the network slice information, and establishing the connection with the base station based on the target network slice.

In this embodiment, selecting the target network slice from the network slices supported by the UE according to the network slice information may include but is not limited to the following situations.

Situation 11) When the network slice information includes a network slice identifier, the network slice corresponding to the network slice identifier is selected from the network slices supported by the UE, and the selected network slice corresponding to the network slice identifier is used as the target network slice.

For example, the network slice identifier included in the network slice information is 3, and the UE selects the network slice 3 from multiple network slices supported by itself, and uses the network slice 3 as the target network slice.

Situation 12) When the network slice information includes multiple network slice identifiers, the network slice identifier with the highest priority is selected from the multiple network slice identifiers, and the network slice corresponding to the selected network slice identifier is used as the target network slice. The multiple network slices corresponding to the multiple network slice identifiers are in the set of network slices supported by the UE.

The priority of the network slice is preset, for example, the priority of network slice 2 is preset to be the highest, then network slice 2 can be selected as the target network slice.

Situation 13) When the network slice information includes multiple network slice identifiers, multiple network slices corresponding to the multiple network slice identifiers are used as target network slices, wherein the multiple network slices corresponding to the multiple network slice identifiers are in the set of network slices supported by the UE.

For example, the network slice identifiers included in the network slice information are 1, 2, and 3, then network slices 1, 2, and 3 may be used as target network slices.

Situation 14) When the network slice information includes multiple network slice identifiers, a network slice identifier is randomly selected from the multiple network slice identifiers, and the network slice corresponding to the selected network slice identifier is used as the target network slice. The multiple network slices corresponding to the multiple network slice identifiers are in the set of network slices supported by the UE.

For example, if the network slice information includes network slice identifiers 1, 2, and 3, then a network slice identifier can be randomly selected from network slice identifiers 1, 2, and 3. Assuming that the selected network slice is network slice 1, the network slice 1 is used as the target network slice.

It should be noted that the above is only examples of selecting the target network slice. In practical applications, any of the above methods or other methods can be used to select the target network slice as required.

In the above embodiment, by receiving the network slice information corresponding to the service to be transmitted sent by the base station, connection can be established with the base station according to the network slice corresponding to the service to be transmitted, which can reduce time and resources consumed for connection establishment, compared with the target UE trying respective network slices supported by itself one by one to connect with the base station.

Figure 3:
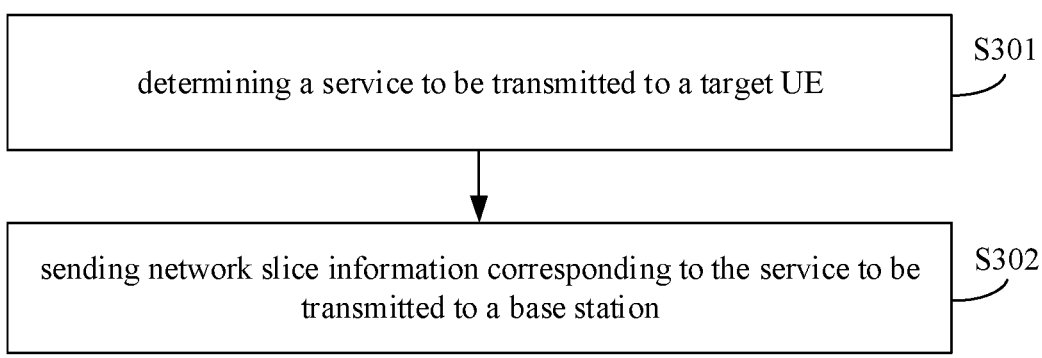
FIG. 3 is a flowchart of yet another method for establishing connection illustrated in an example embodiment of the present disclosure.

FIG. 3 is a flowchart of yet another method for establishing connection illustrated in an example embodiment of the present disclosure. This embodiment is described from the core network side. As shown in FIG. 3, the method for establishing connection includes following steps.

In step S301, a service to be transmitted to a target UE is determined.

In step S302, network slice information corresponding to the service to be transmitted is sent to a base station.

When the service to be transmitted in the core network needs to be transmitted to the target UE, that is, the UE in the idle state, the core network sends the network slice information corresponding to the service to be transmitted to the base station, and the network slice information may include one or more network slice identifiers.

The core network can add the network slice information corresponding to the service to be transmitted in a first paging signaling, and send the first paging signaling added with the network slice information to the base station through an interface between the core network and the base station.

In the above-mentioned embodiment, if it is determined that the service to be transmitted needs to be transmitted to the target UE, the network slice information corresponding to the service to be transmitted is sent to the base station, so that the base station can send the network slice information corresponding to the service to be transmitted to the target UE, to provide conditions for the UE to reduce time and resources consumed by connection establishment.

Figure 4:
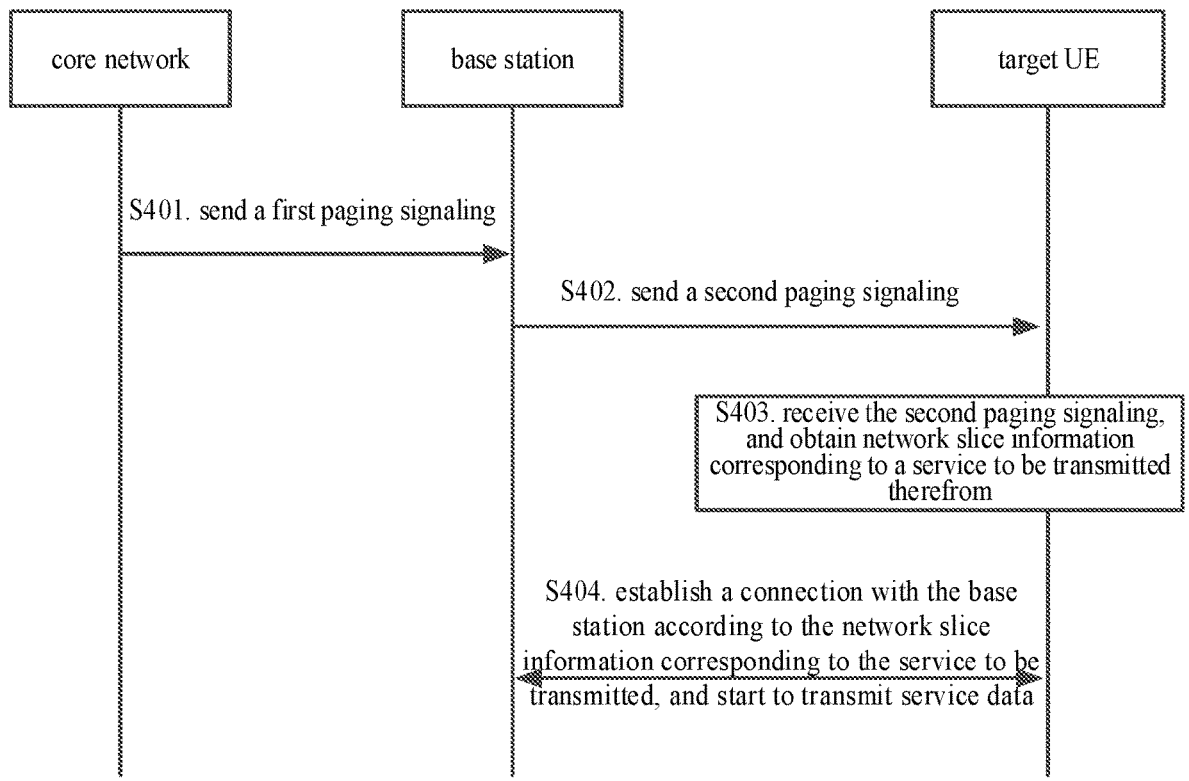
FIG. 4 is a schematic diagram showing signaling of a method for establishing connection illustrated in an example embodiment of the present disclosure.

FIG. 4 is a schematic diagram showing signaling of a method for establishing connection illustrated in an example embodiment of the present disclosure. This embodiment is described from the perspective of interaction between a core network, a base station and a UE. As shown in FIG. 4, the method for establishing connection includes following steps.

In step S401, when a core network determines that a service to be transmitted needs to be transmitted to a target UE, the core network sends a first paging signaling to a base station, wherein the first paging signaling carries target UE information and network slice information corresponding to the service to be transmitted.

In step S402, the base station obtains the target UE information and the network slice information corresponding to the service to be transmitted from the first paging information, and sends a second paging signaling to a target UE, wherein the second paging signaling carries the network slice information corresponding to the service to be transmitted.

In step S403, the target UE receives the second paging signaling, and obtains the network slice information corresponding to the service to be transmitted from the second paging signaling.

In step S404, the target UE establishes a connection with the base station according to the network slice information corresponding to the service to be transmitted, and starts to transmit service data.

In the above embodiment, through the interaction between the core network, the base station and the target UE, the target UE can be connected to the base station according to the network slice corresponding to the service to be transmitted, which can greatly reduce time and resources consumed by the connection establishment, compared with the target UE trying respective network slices supported by itself one by one to establish connection to the base station.

Figure 5:
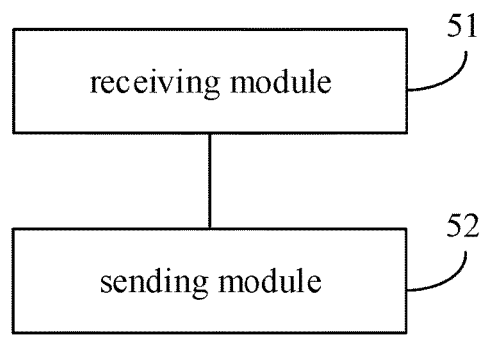
FIG. 5 is a block diagram of an apparatus for establishing connection illustrated according to an example embodiment.

FIG. 5 is a block diagram of an apparatus for establishing connection illustrated in an example embodiment. The apparatus is in a base station. As shown in FIG. 5, the apparatus includes a receiving module 51, a sending module 52, The receiving module 51 is configured to receive target UE information and network slice information corresponding to a service to be transmitted, sent by a core network.

The service to be transmitted may include, but is not limited to, ultra reliable low latency communication (URRLLC) service, and enhanced mobile broad band (eMBB) service.

When the core network is to transmit the service to be transmitted to a target UE, that is, a UE in an idle state, the target UE information and the network slice information corresponding to the service to be transmitted can be sent to the base station. The network slice information may include one or more network slice identifier.

The base station can receive a first paging signaling sent by the core network through an interface between the core network and the base station, and acquire the target UE information and the network slice information corresponding to the service to be transmitted from the first paging signaling.

When the base station is a 4G base station, the interface between the core network and the base station may be an S1 interface. When the base station is a 5G base station, the interface between the core network and the base station may be a next generation (NG) interface.

The sending module 52 is configured to send the network slice information received by the receiving module 51 to a target UE corresponding to the target UE information. The network slice information is configured for establishing a connection between the target UE and the base station.

After receiving the network slice information corresponding to the service to be transmitted, the base station can add the network slice information to a second paging signaling, and send the second paging signaling added with the network slice information to the target UE corresponding to the target UE information through an air interface.

In this embodiment, the network slice information can be added to the second paging signaling in a variety of ways.

Way 11) Add a new signaling in the second paging signaling and add the network slice information in the new signaling.

Way 12) Add a new information unit to the second paging signaling and add the network slice information in the new information unit.

Way 13) Add the network slice information in the existing signaling of the second paging signaling.

For example, the existing signaling may be PagingRecord, and the second paging signaling added with the network slice information is shown as follows, where the black coarse portion is the added network slice information.

```
Paging ::=                  SEQUENCE {
    pagingRecordList            PagingRecordList
OPTIONAL, - Need N
    lateNonCriticalExtension    OCTET STRING
OPTIONAL,
    nonCriticalExtension        SEQUENCE{}
OPTIONAL
}
PagingRecordList ::=        SEQUENCE (SIZE(1..maxNrofPageRec)) OF PagingRecord
PagingRecord ::=            SEQUENCE {
    ue-Identity                 PagingUE-Identity,
    accessType                      ENUMERATED {non3GPP} OPTIONAL, -NeedN
    s-NSSAI-List                    SEQUENCE (SIZE (1..maxNrofS-NSSAI)) OF S-NSSAI OPTIONAL,
    ...
}
PagingUE-Identity ::=       CHOICE {
    ng-5G-S-TMSI                    NG-5G-S-TMSI,
    fulII-RNTI                      I-RNTI-Value,
    ...
}
```

In this embodiment, after receiving the network slice information, the UE can establish the connection with the base station according to the network slice information.

It should be noted that the above-mentioned first paging signaling and second paging signaling are not names of signaling, but are used to distinguish different paging signaling.

In the above embodiment, by receiving the network slice information corresponding to the service to be transmitted sent by the core network, and sending the network slice information to the target UE, the target UE can be connected to the base station according to the network slice corresponding to the service to be transmitted, which can reduce time and resources consumed for connection establishment, compared with the target UE trying respective network slices supported by itself one by one to connect with the base station.

Figure 6:
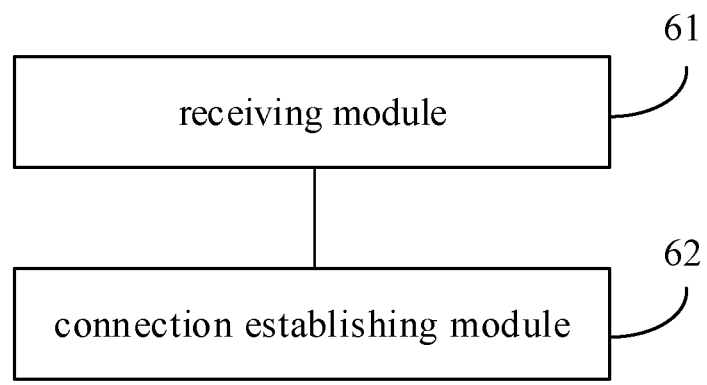
FIG. 6 is a block diagram of another apparatus for establishing connection illustrated according to an example embodiment.

FIG. 6 is a block diagram of an apparatus for establishing connection illustrated according to an example embodiment. The apparatus is in a UE. As shown in FIG. 6, the apparatus includes a receiving module 61 and a connection establishing module 62.

The receiving module 61 is configured to receive network slice information corresponding to a service to be transmitted, sent by a base station.

In this embodiment, the UE may receive a second paging signaling sent by the base station through an air interface, and obtain the network slice information from the second paging signaling.

Since the base station can add the network slice information to a new signaling of the second paging signaling, the UE can obtain the network slice information from the new signaling of the second paging signaling.

Since the base station can add the network slice information in a new information nit of the second paging signaling, the UE can obtain the network slice information from the new information unit of the second paging signaling.

Since the base station can add the network slice information to the existing signaling of the second paging signaling, the UE can obtain the network slice information from the existing signaling of the second paging signaling.

The connection establishing module 62 is configured to establish a connection with the base station according to the network slice information received by the receiving module 61.

Establishing the connection with the base station according to the network slice information may include, but is not limited to: selecting a target network slice from the network slices supported by the UE according to the network slice information, and establishing the connection with the base station based on the target network slice.

In this embodiment, selecting the target network slice from the network slices supported by the UE according to the network slice information may include but is not limited to the following situations.

Situation 11) When the network slice information includes a network slice identifier, the network slice corresponding to the network slice identifier is selected from the network slices supported by the UE, and the selected network slice corresponding to the network slice identifier is used as the target network slice.

For example, the network slice identifier included in the network slice information is 3, and the UE selects the network slice 3 from multiple network slices supported by itself, and uses the network slice 3 as the target network slice.

Situation 12) When the network slice information includes multiple network slice identifiers, the network slice identifier with the highest priority is selected from the multiple network slice identifiers, and the network slice corresponding to the selected network slice identifier is used as the target network slice. The multiple network slices corresponding to the multiple network slice identifiers are in the set of network slices supported by the UE.

The priority of the network slice is preset, for example, the priority of network slice 2 is preset to be the highest, then network slice 2 can be selected as the target network slice.

Situation 13) When the network slice information includes multiple network slice identifiers, multiple network slices corresponding to the multiple network slice identifiers are used as target network slices, wherein the multiple network slices corresponding to the multiple network slice identifiers are in the set of network slices supported by the UE.

For example, the network slice identifiers included in the network slice information are 1, 2, and 3, then network slices 1, 2, and 3 may be used as target network slices.

Situation 14) When the network slice information includes multiple network slice identifiers, a network slice identifier is randomly selected from the multiple network slice identifiers, and the network slice corresponding to the selected network slice identifier is used as the target network slice. The multiple network slices corresponding to the multiple network slice identifiers are in the set of network slices supported by the UE.

For example, if the network slice information includes network slice identifiers 1, 2, and 3, then a network slice identifier can be randomly selected from network slice identifiers 1, 2, and 3. Assuming that the selected network slice is network slice 1, the network slice 1 is used as the target network slice.

It should be noted that the above is only examples of selecting the target network slice. In practical applications, any of the above methods or other methods can be used to select the target network slice as required.

In the above embodiment, by receiving the network slice information corresponding to the service to be transmitted sent by the base station, connection can be established with the base station according to the network slice corresponding to the service to be transmitted, which can reduce time and resources consumed for connection establishment, compared with the target UE trying respective network slices supported by itself one by one to connect with the base station.

Figure 7:
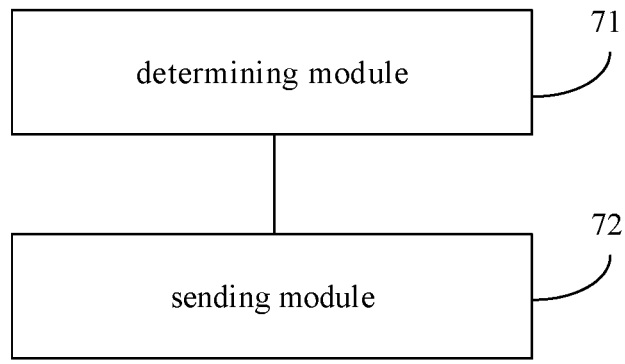
FIG. 7 is a block diagram of yet another apparatus for establishing connection illustrated according to an example embodiment.

FIG. 7 is a block diagram of an apparatus for establishing connection illustrated according to an example embodiment. The apparatus is in a core network device. As shown in FIG. 7, the apparatus includes a determining module 71 and a sending module 72.

The determining module 71 is configured to determine a service to be transmitted to a target UE.

The sending module 72 is configured to send target UE information and network slice information corresponding to the service to be transmitted to a base station.

When the service to be transmitted in the core network needs to be transmitted to the target UE, that is, the UE in the idle state, the core network sends the network slice information corresponding to the service to be transmitted to the base station, and the network slice information may include one or more network slice identifiers.

The core network can add the network slice information corresponding to the service to be transmitted in a first paging signaling, and send the first paging signaling added with the network slice information to the base station through an interface between the core network and the base station.

In the above-mentioned embodiment, if it is determined that the service to be transmitted needs to be transmitted to the target UE, the network slice information corresponding to the service to be transmitted is sent to the base station, so that the base station can send the network slice information corresponding to the service to be transmitted to the target UE, to provide conditions for the UE to reduce time and resources consumed by connection establishment.

Figure 8:
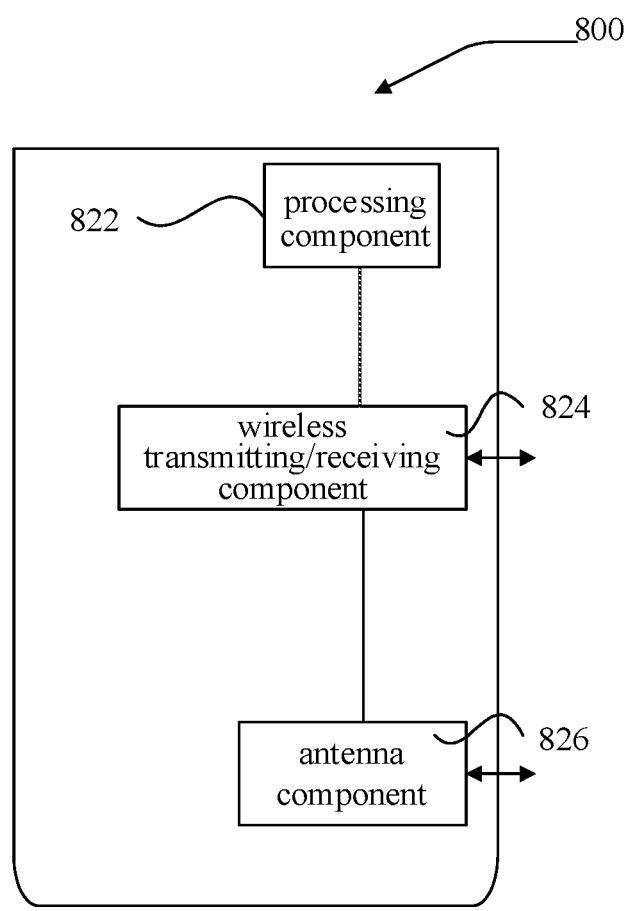
FIG. 8 is a block diagram of a device suitable for establishing connection illustrated according to an example embodiment.

FIG. 8 is a block diagram of another apparatus suitable for establishing connection according to an example embodiment. The apparatus 800 may be provided as a base station. Referring to FIG. 8, the apparatus 800 includes a processing component 822, a wireless transmitting/receiving component 824, an antenna component 826, and a signal processing portion specific to a wireless interface, and the processing component 822 may further include one or more processors.

One of the processors in the processing component 822 may be configured to:
  receive target user equipment (UE) information and network slice information corresponding to a service to be transmitted, sent by a core network;
  send the network slice information to a target UE corresponding to the target UE information, wherein the network slice information is configured to establish a connection between the target UE and the base station.

In an example embodiment, there is also provided a non-transitory computer-readable storage medium including instructions executable by the processing component 822 of the apparatus 800 to complete the method for establishing connection described above. For example, the non-transitory computer-readable storage medium may be ROM, random access memory (RAM), CD-ROM, magnetic tape, floppy disk, optical data storage device, and the like.

Figure 9:
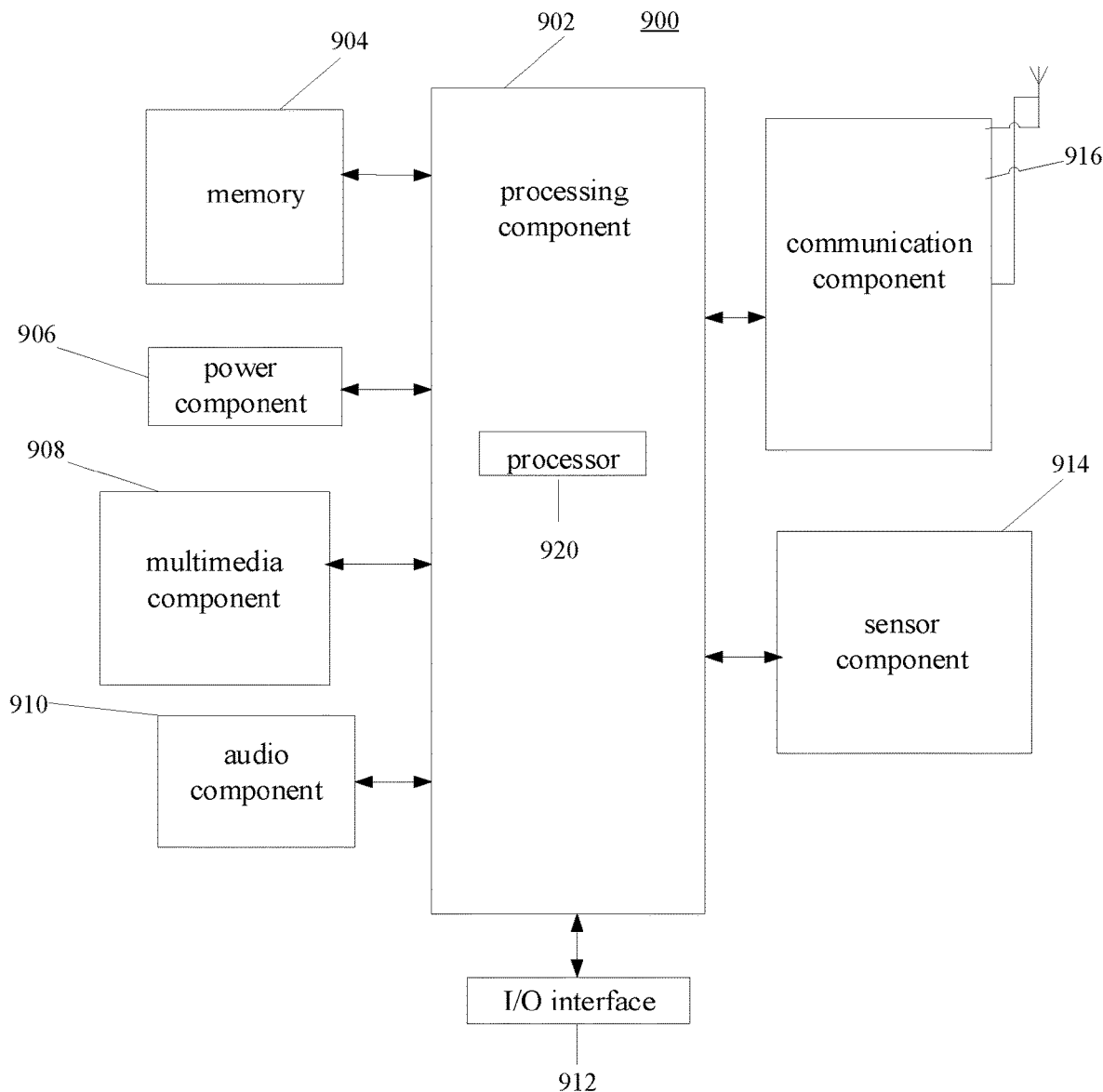
FIG. 9 is a block diagram of a device suitable for establishing connection illustrated according to an example embodiment.

FIG. 9 is a block diagram of an apparatus suitable for establishing connection according to an example embodiment. For example, the apparatus 900 may be a mobile phone, a computer, a digital broadcasting terminal, a message transceiver device, a game console, a tablet device, a medical device, a fitness device and a personal digital assistant.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 generally controls overall operation of the apparatus 900, such as the operations associated with display, telephone calls, data communications, camera operations, and recording operations. The processing component 902 may include one or more processors 920 to execute instructions to perform all or part of the steps in the above described method. Moreover, the processing component 902 may include one or more modules which facilitate the interaction between the processing component 902 and other components. For instance, the processing component 902 may include a multimedia module to facilitate the interaction between the multimedia component 908 and the processing component 902.

One processor 920 in the processing component 902 may be configured to:
  receive network slice information corresponding to a service to be transmitted, sent by a base station;
  establish a connection with the base station according to the network slice information.

The memory 904 is configured to store various types of data to support the operation of the apparatus 900. Examples of such data include instructions for any applications or methods operated on the apparatus 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front-facing camera and/or a rear-facing camera. When the apparatus 900 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components, e.g., the display and the keypad, of the apparatus 900, a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The apparatus 900 can access a wireless network based on a communication standard, such as WiFi, 2G, or 3G, or a combination thereof. In an exemplary embodiment, the communication component 916 receives a broadcast signal or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 904, executable by the processor 920 in the apparatus 900, for performing the above method for establishing connection. For example, the non-transitory computer-readable storage medium may be a ROM, a RAM, a CD-ROM, a magnetic tape, a floppy disc, an optical data storage device, and the like.

Figure 10:
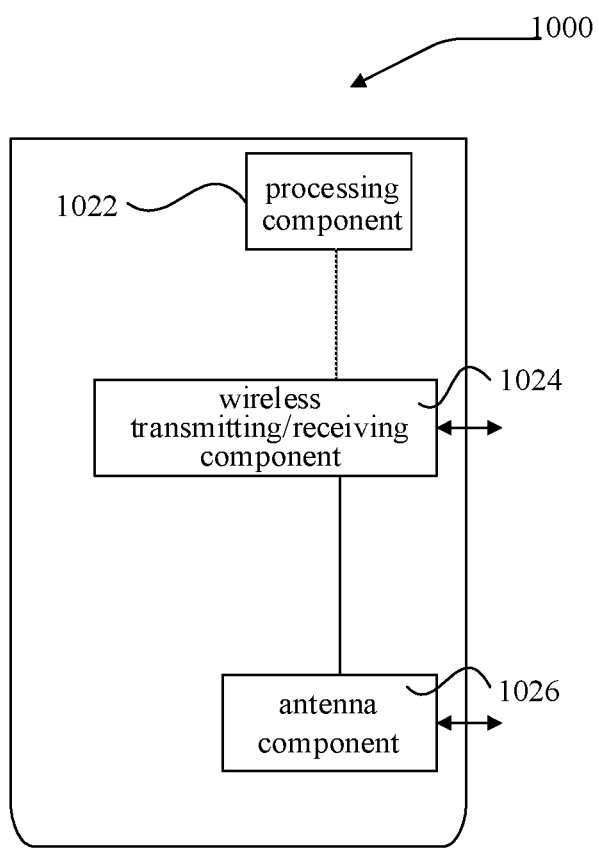
FIG. 10 is a block diagram of another device for establishing connection illustrated according to an example embodiment.

FIG. 10 is a block diagram of another apparatus suitable for establishing connection according to an example embodiment. The apparatus 1000 may be provided as a core network device. Referring to FIG. 10, the apparatus 1000 includes a processing component 1022, a wireless transmitting/receiving component 1024, an antenna component 1026, and a signal processing portion specific to a wireless interface, and the processing component 1022 may further include one or more processors.

One of the processors in the processing component 1022 may be configured to:
 determine a service to be transmitted to a target UE;
 send target UE information and network slice information corresponding to the service to be transmitted to a base station.

In an example embodiment, there is also provided a non-transitory computer-readable storage medium including instructions executable by the processing component 1022 of the apparatus 1000 to complete the method for establishing connection described above. For example, the non-transitory computer-readable storage medium may be ROM, random access memory (RAM), CD-ROM, magnetic tape, floppy disk, optical data storage device, and the like.

As for the apparatus embodiments, since they basically correspond to the method embodiments, reference may be made to the partial descriptions of the method embodiments for relevant parts. The apparatus embodiments described above are only illustrative, wherein the units described as separate components may or may not be physically separated, and the components shown as units may or may not be physical units, that is, they may be located in one place, or distributed to multiple network elements. Some or all of the modules may be selected according to actual needs to achieve the purpose of the solution in this embodiment. Those of ordinary skill in the art can understand and implement it without creative effort.

It should be noted that in this document, relational terms such as first and second are used only to distinguish one entity or operation from another, and do not necessarily require or imply that there is any such actual relationship or sequence between these entities or operations. The terms "comprising", "including" or any other variation thereof are intended to encompass non-exclusive inclusion such that a process, method, article or apparatus comprising a list of elements includes not only those elements, but also other not expressly listed elements, or also include elements inherent to such a process, method, article or apparatus. Without further limitation, an element qualified by the phrase "comprising a . . . " does not preclude the presence of additional identical elements in the process, method, article, or apparatus that includes the element.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for establishing connection, performed by a base station, comprising:
   receiving target user equipment (UE) information and network slice information corresponding to a service to be transmitted, sent by a core network; and
   sending the network slice information to a target UE corresponding to the target UE information, wherein the network slice information comprises a plurality of network slice identifiers, the network slice information is configured for the target UE to select a network slice identifier with a highest priority from the plurality of network slice identifiers, and use a network slice corresponding to the selected network slice identifier as a target network slice to establish the connection with the base station based on the target network slice, wherein, a plurality of network slices corresponding to the plurality of network slice identifiers are located in a set of network slices supported by the UE.

2. The method according to claim 1, wherein receiving target UE information and network slice information corresponding to the service to be transmitted, sent by the core network comprises:
   receiving a first paging signaling sent by the core network through an interface between the core network and the base station; and
   obtaining the target UE information and the network slice information corresponding to the service to be transmitted, from the first paging signaling.

3. The method according to claim 1, wherein sending the network slice information to the target UE corresponding to the target UE information comprises:
   adding the network slice information in a second paging signaling;
   sending the second paging signaling added with the network slice information to the target UE corresponding to the target UE information through an air interface.

4. The method according to claim 3, wherein adding the network slice information in the second paging signaling comprises:
   adding a new signaling and/or a new information unit in the second paging signaling, and adding the network slice information in the new signaling and/or the new information unit; or
   adding the network slice information to an existing signaling of the second paging signaling.

5. A method for establishing connection, performed by a user equipment (UE), comprising:
   receiving network slice information corresponding to a service to be transmitted, sent by a base station;
   in response to the network slice information comprises a plurality of network slice identifiers, selecting a network slice identifier with a highest priority from the plurality of network slice identifiers, and using a network slice corresponding to the selected network slice identifier as a target network slice, wherein, a plurality of network slices corresponding to the plurality of network slice identifiers are located in a set of network slices supported by the UE; and
   establishing the connection with the base station based on the target network slice.

6. The method according to claim 5, wherein receiving the network slice information corresponding to the service to be transmitted, sent by the base station comprises:
   receiving a second paging signaling sent by the base station through an air interface;
   obtaining the network slice information from the second paging signaling.

7. The method according to claim 6, wherein obtaining the network slice information from the second paging signaling comprises:
   obtaining the network slice information from a new signaling and/or a new information unit of the second paging signaling; or
   obtaining the network slice information from an existing signaling of the second paging signaling.

8. A method for establishing connection, performed by a core network device, comprising:
   determining a service to be transmitted to a target user equipment (UE);
   sending target UE information and network slice information corresponding to the service to be transmitted to a base station;
   wherein the network slice information comprises a plurality of network slice identifiers, the network slice information is configured for the target UE to select a network slice identifier with a highest priority from the plurality of network slice identifiers, and use a network slice corresponding to the selected network slice identifier as a target network slice to establish the connection with the base station based on the target network slice, wherein, a plurality of network slices corresponding to the plurality of network slice identifiers are located in a set of network slices supported by the UE.

9. The method according to claim 8, wherein sending the network slice information corresponding to the service to be transmitted to the base station comprises:
   adding network slice information corresponding to the service to be transmitted in a first paging signaling;
   sending the first paging signaling added with the network slice information to the base station through an interface between the core network and the base station.

10. A base station, comprising:
    a processor;
    a memory configured to store instructions executable by the processor;
    wherein the processor is configured to implement the method of claim 1 by executing the instructions stored in the memory.

11. A user equipment, comprising:
    a processor;
    a memory configured to store instructions executable by the processor;
    wherein the processor is configured to implement the method of claim 5 by executing the instructions stored in the memory.

12. A core network device, comprising:
a processor;
a memory configured to store instructions executable by the processor;
wherein the processor is configured to implement the method of claim 8 by executing the instructions stored in the memory.

* * * * *